(12) United States Patent
Nishizawa

(10) Patent No.: US 6,857,006 B1
(45) Date of Patent: Feb. 15, 2005

(54) MULTIMEDIA DIRECT COMMUNICATION SYSTEM LINKED WITH HTTP PROTOCOL

(75) Inventor: Yasuo Nishizawa, Tokyo (JP)

(73) Assignee: Mitsui & Co., Ltd., Tokyo (JP)

( * ) Notice: Subject to any disclaimer, the term of this patent is extended or adjusted under 35 U.S.C. 154(b) by 0 days.

(21) Appl. No.: 09/530,954

(22) PCT Filed: Sep. 16, 1998

(86) PCT No.: PCT/JP98/04151

§ 371 (c)(1),
(2), (4) Date: May 16, 2000

(87) PCT Pub. No.: WO00/16201

PCT Pub. Date: Mar. 23, 2000

(51) Int. Cl.[7] .............................. G06F 15/16; G06F 3/00
(52) U.S. Cl. ...................... 709/204; 709/203; 709/230; 709/206; 709/207; 719/311
(58) Field of Search ................................ 709/201–204, 709/205, 230, 217

(56) References Cited

U.S. PATENT DOCUMENTS

| | | | | |
|---|---|---|---|---|
| 5,793,365 A | * | 8/1998 | Tang et al. .................. | 345/758 |
| 5,956,491 A | * | 9/1999 | Marks ......................... | 709/250 |
| 5,974,446 A | * | 10/1999 | Sonnenreich et al. ........ | 709/204 |
| 5,974,449 A | * | 10/1999 | Chang et al. ................ | 709/206 |
| 6,023,698 A | * | 2/2000 | Lavey et al. ................. | 709/203 |
| 6,038,296 A | * | 3/2000 | Brunson et al. ........ | 379/100.11 |
| 6,128,653 A | * | 10/2000 | del Val et al. ............... | 709/203 |
| 6,144,991 A | * | 11/2000 | England ....................... | 709/205 |
| 6,199,082 B1 | * | 3/2001 | Ferrel et al. ................. | 715/522 |
| 6,240,443 B1 | * | 5/2001 | Suzuki et al. ................ | 709/204 |
| 6,421,706 B1 | * | 7/2002 | McNeill et al. ............. | 709/204 |
| 6,430,409 B1 | * | 8/2002 | Rossmann ............... | 455/422.1 |
| 6,446,130 B1 | * | 9/2002 | Grapes ......................... | 709/231 |
| 6,484,196 B1 | * | 11/2002 | Maurille ...................... | 709/206 |
| 6,578,067 B1 | * | 6/2003 | Okazaki et al. ............. | 709/203 |
| 6,785,708 B1 | * | 8/2004 | Busey et al. ................. | 709/204 |

OTHER PUBLICATIONS

"Point–Illustrated Communication Protocol Handbook", supervised by Hidematsu Kasano, edited by Multimedia Tsushin Kenkyukai, Ascii Corp, Apr. 11, 1996, p539–567.
"Internet Magazine", vol. 38, Impress Corp., Mar. 1, 1998 p213–221.
"Internet Magazine", vol. 38, Impress Corp., Aug. 1, 1997 p266–267, p275, p279–289.
"Internet Magazine", No. 39, Impress Corp., Apr. 1, 1998 p210–211.
"Internet Magazine", No. 22, Impress Corp., Nov. 1, 1996 p194–209.
"Intranet", vol. 1, No. 9, Softbank Corp., Sep. 1, 1997 p52–68.
Shishir Gundavaram, supervised by Shigenari Tanabe, translated by K.K. Edikkusu, "CGI Programming", K.K. Orairi Japan, Nov. 15, 1996, p289–341.

* cited by examiner

Primary Examiner—Zarni Maung
Assistant Examiner—Anita Choudhary
(74) Attorney, Agent, or Firm—Jacobson Holman PLLC

(57) ABSTRACT

A multimedia direct communication system linked with HTTP protocol, which comprises application programs and a Web server, wherein the application programs are installed into a plurality of client personal computers (PCs), reside in the PCs such that they are displayed for many hours on the PCs occupying a part of the space on the display of the PCs, and are linked at all times with a Web server via HTTP; the Web server has a CGI interface and is connected to each of the PCs through communication circuits to execute the HTTP communication programs and applications; and each client can transfer (chat) electronic mails with each other in pseudo-real time via Internet and/or Intranet using the application programs.

17 Claims, 3 Drawing Sheets

MULTIMEDIA DIRECT COMMUNICATION SYSTEM LINKED WITH HTTP PROTOCOL

TECHNICAL FIELD

This invention relates to improvement of a system which enables semi real time communication by electronic mail or other methods and simultaneously enables transmission and reception of multimedia type of communication in a personal computer (hereinafter referred to as PC) of each client which is connected with WEB server through Internet or Intranet, by controlling each client by HTTP protocol through WEB server.

BACKGROUND ART

HTTP is the abbreviation of HyperText Transport Protocol which is a telecommunication protocol popularly used for access to WEB site. WWW (World Wide Web) servers are composed to be able to activate HTTP programs, and handle data after WEB pages in the WEB servers get accesses from each client.

HTTP is a software program which usually waits for accesses at the WEB server, and manages communication transactions between the server and the clients. Then, if the HTTP gets accesses from the client side, it enables users to look Hyper/Text in WEB browser on the client's PC.

CGI (Common Gateway Interface) is a common interface to execute exterior applications called CGI programs executed on WEB servers.

IRC server is the abbreviation of Internet Relay Chat Server which is composed to enable real time and interactive message communication on the Internet. Through this IRC server, multi clients are able to chat on the real time base. Perfect real time chat session between clients on the Internet requires special server such as IRC server instead of WEB server.

In the environment mentioned above, the following system (1)~(3) are known:
(1) Ordinary Chat System on WEB (WEB Chat System)

This is so called regular "Chat" system performed on the Internet browser. This is well known and frequently used at the present, and enables frequent transmission and receipt of text messages between multi clients by activating chat function program composed on the WEB server
(2) ICQ Type System This is an application system which is always staying in a screen of client's PC without running browser and always communicating through Internet with a special server such as IRC server, and enables real time chat between multi clients through IRC sever. This type of system prevails widely, and as well as ICQ, many systems such as Yahoo Pager, Excite PAL, and AOL IM are used by many users.
(3) Push Technology There have been systems and an application called Push Technology. It sends some specific information from WEB server to client's PC connected with Internet or Intranet in accordance with time or rule specified by a client in advance. This system is the technology which can send information from WEB server to client's PC without running browser.

However, the conventional technology does not have the following functions:
(1) Ordinary Type of WEB Chat System Users have to move browser (Netscape or Internet Explorer, etc.) with this type of system, and usually chat on browser. Therefore, such system does not have the function to stay on client's PC and communicate with WEB server in the situation of inactivating browser, and the function eventually to move browser upon instruction from WEB server and activate other applications, and the function like Push Technology in which WEB type application for Chat system pushes some specific information to the client side. Besides, the conventional WEB chat system does not interlock with such functions.

Furthermore, since the conventional browser chat system is merely WEB server application activating on browser specialized in chat only, the system does not have such a function to stay on client's PC and always communicate with other WEB server applications in the background (while client is not conscious of it).

In other words, the conventional system merely enables only chat on client's browser through simple WEB server.
(2) ICQ Type System Because this type of application system needs special server such as IRC server, it was impossible to compose a system utilizing WEB server. Therefore, this application was not possible to dynamically interlock with other applications in the WEB server.

Besides, as is the most serious defect, it is necessary to go through Intranet proxy/firewall in order to realize real time chat (communication with electronic message) by IRC server. But proxy/firewall of intranet in ordinary corporation or governmental office is composed in the manner that session with special sever such as IRC server is impossible unless a system administrator specially sets up and "makes hole" at the proxy server so that clients can chat each other using special server such as IRC server. Conversely, there is no firewall or proxy server which allow any communication to pass through without making any hole, and it is necessary to change system configuration of firewall/proxy in order to communicate among multi clients with IRC server and the application.

In the usual Internet server, Port 80 is assigned to the WEB application by HTTP protocol, and HTTP transaction is possible through this port number. But real time chat using special server such as IRC server does not use the port 80. On the other hand, access to the ordinary Internet server out of office through Intranet from office such as ordinary corporation, school, governmental office is usually done through this port 80. However, communication using the conventional IRC server can not go through this port 80, and it has been a problem that any session (logical connection between transmitter and recipient) is not possible unless a system administrator purposely "makes hole" at the port of which number is 1024 or more (for example 2000 or 3000).

Furthermore, the conventional system like IRC has possessed only a communication function as a main function despite it always stays on the top of client's PC screen. And multimedia function such as visual communication like TV phone, movie, and game in the main screen of the application, or showing graphic information, or playing music has been impossible.

That is, although the conventional IRC type application has occupied some precious space on the client's PC screen while PC is activated and always connected with some special Internet server, the application has enabled only chat on such important space.

In other words, although this type of application aims to occupy some precious space in the client's PC as the real 'portal' to the Internet/Intranet for a long time, the information given to the client in the space is only information in relation to chat with other clients which has been the most important purpose of the conventional system.

For example, only information such as who are connecting with whom or away from the desk is displayed on the screen. Although this space occupied by the application is very important space, the function to distribute multimedia information such as movie, still picture, music, game, graphic, and character information has not been provided.

This has been essentially fundamental serious drawback caused by the fact that the conventional system is connected only with the special server through special protocol specialized in communication instead of HTTP protocol with WEB server.

Besides, such system, which needs permanent connection with special server such as IRC server, causes a situation in which clients always connect with outside through the "hole" made specially. This implicitly means the problem that authorization of clients, identity authorization, and supervising/management of checking and permitting the right of entering/leaving the system is impossible, because background thought is different from that of firewall/proxy which strictly shuts out from the inside and outside. In this sense, it has been a problem to approve the usage of ICQ type of communication method in such environment as Intranet, because it really means making "hole" into proxy server.

Furthermore, since ICQ type of system does not assume cryptograph, if ICQ use cryptograph, it is impossible to use such popular type of cryptograph as SSL or SET which is popular and interlocking with HTTP protocol used for the communication between browser and WEB server.

Besides, when the screen of ICQ type of application is used as portal, the method of cryptograph for multimedia information from other WEB server can not be the one interlocking with HTTP, and the original one should be specially developed.

(3) Push Technology

The conventional push technology is broadcasting type service. The technology is always pours information to client's PC, and does not have a system to interlock with communication portion like that of this invention. There is just a system to push information from server to client's PC without running browser, and there is not a tool to communicate directly with information providers or related persons.

In such environment, this invention solves the shortcomings of the simple chat communication system based on the conventional technology. And this invention is a telecommunication system which has very much dynamic multimedia functions in the same way as WEB browser to be able to go through ordinary configuration firewall/proxy server.

This invention can also automatically pick up character information, music, and movie from WEB server in accordance with H=SP instruction whichever browser software is open or not. And this invention can also display multimedia information from WEB server to some specific space occupied at client's PC, and enables clients to chat like telephone chat using the function of such a space of this application.

DISCLOSURE OF THE INVENTION

That is, this invention consists of application interlocking with HTTP embedded in each client's PC and HTTP telecommunication program connected with above mentioned client's PC and WEB server which has CGI interface to execute application. And this invention is a communication system composed of WEB server system which enables semi-real time chat (electronic message communication) through Internet and Intranet between each client and client's application interlocking HTTP.

The second invention is a communication system, characterized by enabling above mentioned application to access to WEB server through HTTP communication program, without booting browser software of each client.

The third invention is characterized by the configuration of both special client's application and WEB server in the manner that in order to enable semi real "electronic communication" (Chat) without booting browser at client side or using special server like IRC server, WEB server is used in order to pass through port 80 of proxy/firewall especially for the purpose of communication with Internet from Intranet.

The forth invention is characterized by the design and combination of application and WEB server so that several multimedia application (game, motion picture, graph, music, and character information, etc.) activates on the small space of client's PC occupied by HTTP interlocking application. This has been the shortcoming of the conventional technology, so that other WEB applications can not easily run on the same HTTP interlocking application on the client side. That is why it is very much important to realize chat using WEB server instead of special server such as IRC server.

The fifth invention is characterized by the function that the WEB server of this system is always checking the client side whether the client is connecting with the server or ready to chat, or whether any request or instruction is given to each client from the server aide.

The sixth invention is characterized by the possibility of chat among multi clients which becomes possible when clients choose person/client (multi is possible) and send chat request messages and the recipients accept the request.

The seventh invention is characterized by the configuration to be able to continually send several kinds of messages (weather forecast, stock price information, news, and fortune telling message, etc.) in the form of character to the application by the specific procedure.

The eighth invention is characterized by the configuration to be able to activate another browser by clicking HTML format display which enables hyper-linkage at the application portion in the client side.

The ninth invention is characterized by the configuration to be able to show the faces and motion pictures of other party of chat and to communicate with the party like TV phone on the space of application at the client side by specific procedure.

The tenth invention is characterized by the system which has "identity confirmation" and "verification confirmation" functions which confirm whether the person has the right to access the WEB server when the client access to the WEB server and start using the client application, chatting with other clients, and taking multimedia information from the WEB server by choosing the above mentioned multimedia functions.

The eleventh invention is characterized by this system which has the function to be able to code the message in the cipher method interlocking with HTTP like SSL or SET which is popularly used at proxy/firewall server when the client starts by using the client application accessing to the WEB server and chatting with other clients and taking multimedia information from the WEB server by choosing the above mentioned multimedia functions.

THE BEST MODE CARRYING OUT THE INVENTION

Figure 1:
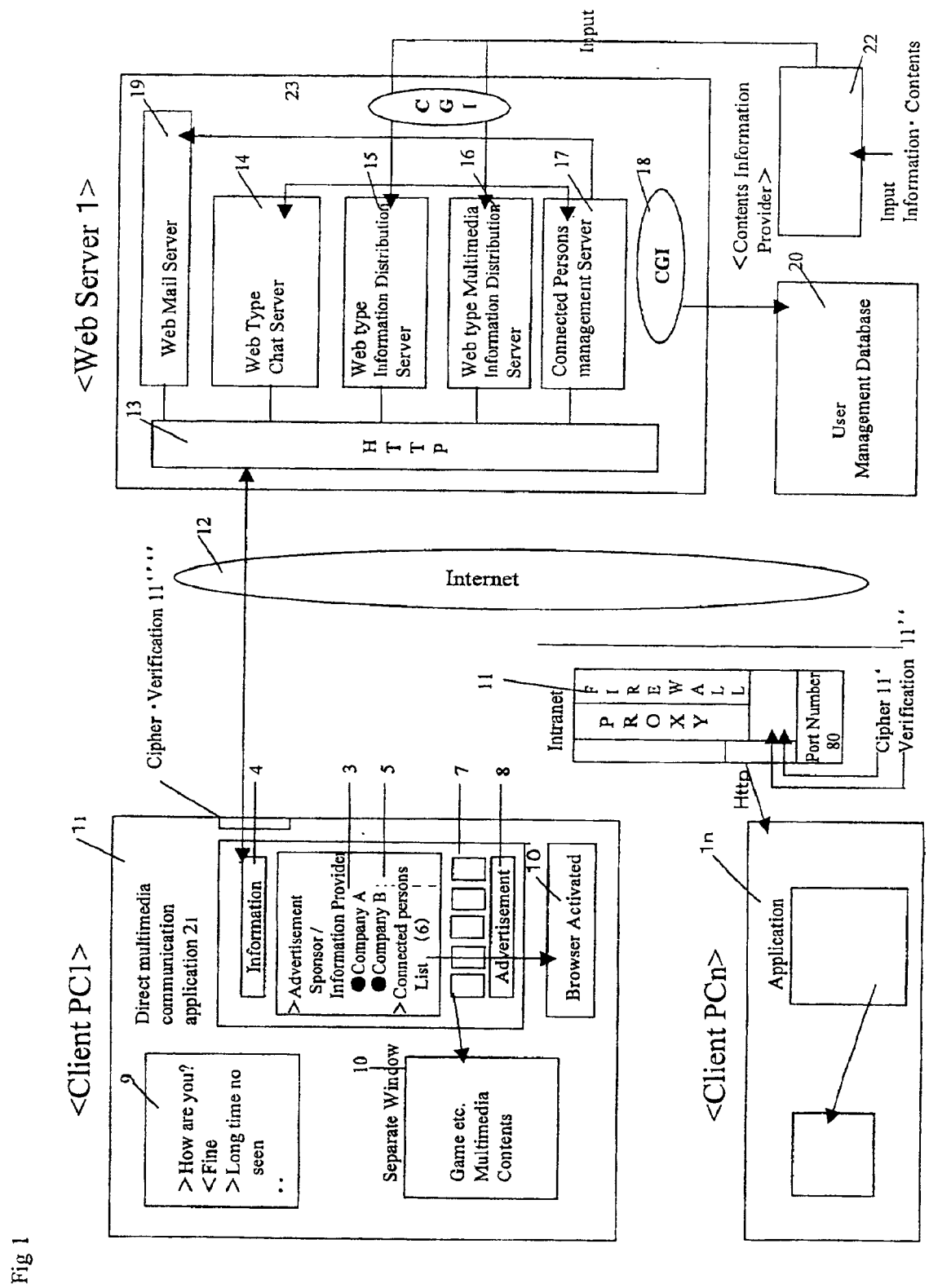
FIG. 1 is a total illustration of the multimedia direct communication system utilizing Internet/Intranet.
Figure 2:
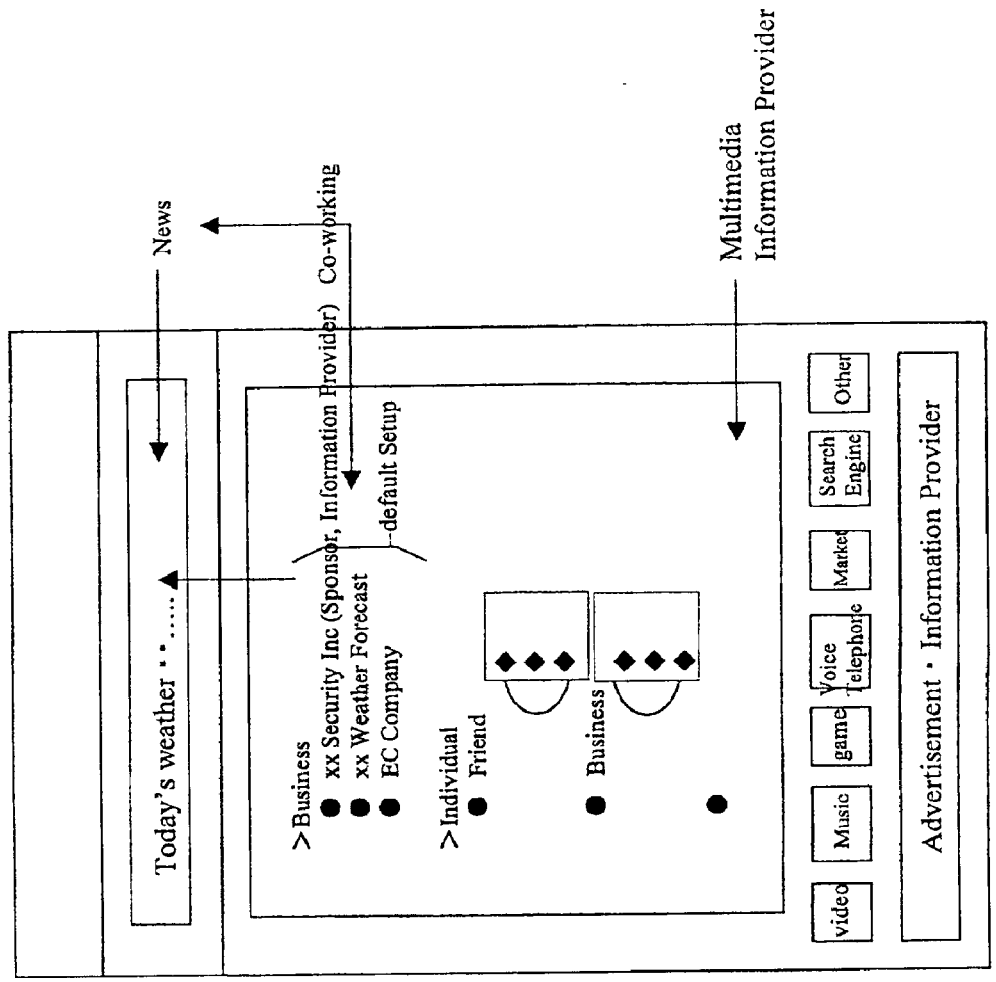
FIG. 2 is a display portion of the client's application of the multimedia direct communication system utilizing Internet/intranet.
Figure 3:
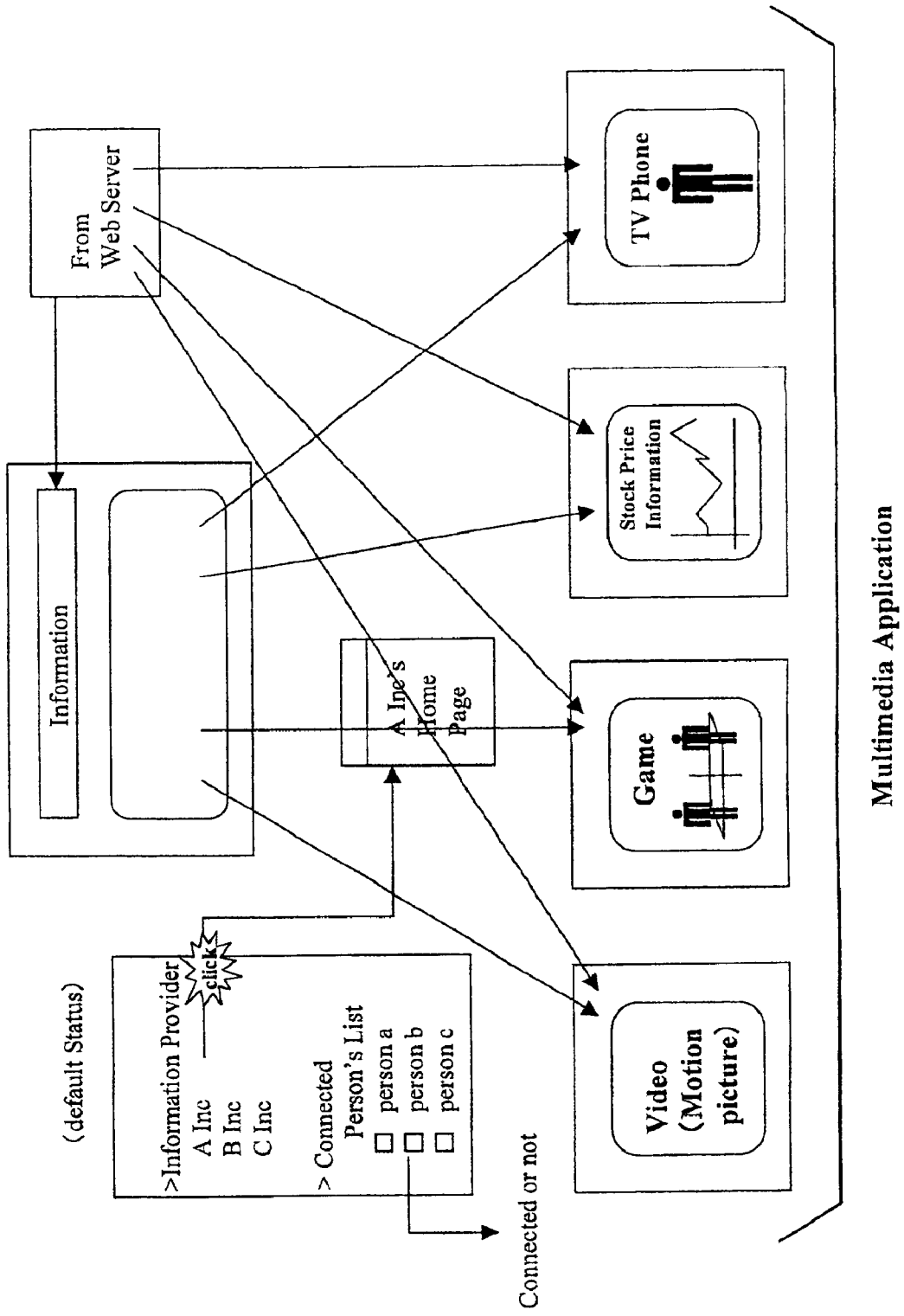
FIG. 3 is a block diagram explaining the multimedia function.

FIG. 1 is the outline chart concerning this invention. $PC_1$-PCn is personal computer (called herewith PC) of each client $1_1$-1n. The $PC_1$-PCn are composed to interlock with HTTP, and the direct multimedia communication applications $2_1$-2n are installed in the PC. The applications are stored in memory such as a hard drive as the applications are supposed to stay on the PC for a long time while the PC is connected with Internet or Intranet.

Each client is connected with Internet 12 and/or Intranet 11 and WEB server 1 through public line, telephone line, and special line or LAN.

The WEB server 1 includes HTTP communication program 13, WEB chat server 14 which enables WEB type chat, WEB type information distribution server 15, WEB type Multimedia information distribution server 16, connection list management server 17, and other several WEB mail server programs.

The application 2, on the Client PC, consists of the information display part 4, display part 3 which is hyperlinked by HTML, and display part 6 of connected and/or registered members, display part 6 to simultaneously show multimedia type information (motion picture, still picture, music, graphic, character information, game, etc.), display part 7 of multimedia function choice, and display part 8 of the advertisement type message.

The display part 5 of connecting person has a function to show whether the other clients PCi, the members registered before by the clients themselves, are connected with the WEB server 1.

When the client chooses and clicks from this connecting persons list on display part 5 the party PCi (domain name) whom the client wants to communicate with, a communication request message is sent to the party PCi through Intranet/Internet 12 and WEB server 1. If the client 1n accepts it, the other window 9 is pop up and chat (communication of electronic sentence) starts on the pop up window. This chat is possible among multi clients.

When the button of multimedia function selection display part 7 is selected, requested several WEB type multimedia information stored in WEB server 1 is sent and displayed on the display part 6. For example, when motion pictures are sent in the streaming status (to be able to be regenerated), whole set of this application 2 functions like TV set, or when games made of Shockwave, Flash, and Java, etc. are distributed from WEB server 1, this application 2 functions like a game player. Besides, this application can show the movement of stock price on the application 2 by receiving stock price information in the form of graphic information. And depending on the configuration, this system can be composed so that other window 10 or homepage browser software 10n can open.

When so called TV telephone function is selected in the multimedia function selection display part 7, the picture of the counter party's face is shown on the display space of the said application 2 and voice simultaneously comes out.

If the client 1n exists in the environment like Intranet and is connected with external Internet 12 through proxy server 11 including or not including firewall 11 in the FIG. 1 shown in the illustration, the client can go through the port 80. This means HTTP protocol can go through the port 80.

It is possible to send several information to the information display part 4 in the application 2 by working with WEB type information distribution server 15 in the WEB server 1. And it is also possible to display the information in accordance with the designated rule and the configuration requested by the client, by the way of sending information from the server system 22 which is connected with external contents information provider 21 through WEB server 1 and CGI interface 23.

WEB server 1 has connecting persons list management server 17, and it interlocks with user management database 20 through CGI interface 18, and is always managing which client is being connected or which client is ready to receive chat.

Firewall/Proxy server 11 has functions of "Identity confirmation" and "Verification Confirmation". These functions check in accordance with the stipulated procedure whether the client has the right to access the WEB server, and passing through the Firewall becomes possible only with effective ID and password input by the client.

Such "Verification Confirmation" for going in and out from the Internet/Intranet etc is integrally managed and supervised by the commonly same rule for access to the other WEB server, not special one for the special server such as IRC.

Because electronic message chat and multimedia information is uniformly handled with WEB server by HTTP protocol, the electronic message chat and multimedia information is able to be ciphered in the integral same cipher method like popular cipher SSL or SET which is interlocked with HTTP at the cipher program 11'" at the firewall/proxy server 11 and client 11.

Besides, while the above working example is made for the case that the application is always connected with Internet and Intranet, it is certainly possible to compose the system in which each client PC accesses to the WEB server 1 through Internet in every interval time stipulated before by the dial up program in accordance with TCP/IP embedded in the client PC.

In such case, chat itself is semi real time communication. This is because WEB server 1 stores the information of the other party whom the client wants to chat with, and distributes the information to the other client PC on behalf of each client.

INDUSTRIAL APPLICABILITY

As mentioned above, the most characteristic feature of this invention is that a multimedia type communication tool integrally controlled by HTTP is deliberately developed in the form of one application which perfectly interlocks with WEB server, but not on browser software.

Therefore, while existing ICQ type communication tool uses special protocol other than HTTP and special server like IRC server other than WEB server is necessary, a client in this system can freely chat with other clients, whether or not the client is inside Intranet, as long as the client exists in the environment to be able to watch ordinal WEB.

And as long as there is WEB server which supports ordinary WEB, this application can be used as "window" for handling several types of multimedia information other than dealing electronic message (chat) on this application.

That is, although the conventional ICQ type of communication application supposes the condition that the application is always activated on the display of client's PC so that chat with other client registered at the application is anytime possible as well as telephone and this type system is intensely promoted commercially as the "portal" to the Internet, the screen of this application (FIG. 1–6) is not made to be able to transmit and receive multimedia information on the, "place" of the PC as the portal because existing system uses a special server such as IRC server. This invention fundamentally develops the conventional type of application despite its appearance is similar with the conventional one so that this application can function as 'window' of multimedia information not as simple one enabling only chat by changing the working principle to HTTP. Therefore, while both aims to be the "Internet portal" for clients, this invention increases value of the "portal" to the maximum at most.

Because of the working principle adopted by the present invention (HTTP and WEB server), communication can go through almost all Intranet and Internet environment. Especially, in the office where many PCs are always connected with LAN in the form of Intranet and are connected with external Internet through Proxy/Firewall, epoch-making effective usage can be possible with this invention, because as long as this application is running on PC, communication with other clients and getting several multimedia WEB information are possible without activating browser and bothering system administrator by opening port at proxy like ICQ.

Therefore, this invention can be powerful "Internet multimedia" porter, at the client's PC which is always connected with external Internet world through Intranet or special line.

Besides, this invention can cipher in the integral manner both chat message and multimedia information using cipher method interlocking with HTTP (SSL, SET etc) popularly used in Internet, because this invention controls both communication message and multimedia information by HTTP.

On the other hand, ICQ type system can not use SSL nor SET which is popularly used as Internet cipher. This is because this type of system uses the different protocol from HTTP and two different cipher methods are necessary for WEB server communication and chat on this type of system, which causes inconvenience that two types of security systems need to be prepared. In this invention system, all messages are handled as communication with WEB server by HTTP, and cipher can also be managed in integral manner of the most popular method (SSL, SET, etc.). This means that security can be consistently integrated.

Besides, from the security point of view, security management for whole system can be strengthened more. This because some special port need not be opened in Proxy server/Firewall, and the cipher can be consistently managed by one system which are used as cipher for WEB server communication, and "Identity confirmation" and "Verification Conformation" are possible by integral manner exactly in the same manner as that popularly used for WEB server communication by HTTP.

What is claimed is:

1. A multimedia direct communication system comprising:
    a web server connected to a distributed computer network, said web server including an electronic message communication (chat) server having a CGI interface;
    an application program embedded in a plurality of client personal computers connected via said distributed computer network, said application program interlocking with HTTP protocol to work with said web server using said HTTP protocol;
    said web server using a PC application so that said plurality of client personal computers communicate with each other in semi-real-time electronic message communication (chat) by interlocking with HTTP protocol;
    said application program including a display window for displaying said chat; and
    said application program also activating, displaying, transmitting and receiving multimedia applications, information and contents by working with said web server through said HTTP protocol, said multimedia applications, information and content being displayed concurrently and in said same display window with said chat, said application program consistently accessing and communicating with said web server by interlocking with HTTP protocol without activating browser software.

2. The multimedia direct communication system as set forth in claim 1, wherein each of said client personal computers includes a memory for storing said application program and data from said multimedia applications, storage of said data allowing a user continuing access to said data when said client personal computer is not in communication with said web server.

3. The multimedia direct communication system as set forth in claim 2, wherein said application program has a function enabling a user to input data manually to the memory for storage therein and to transmit said data from the client personal computer to an interlocked web application on the web server.

4. The multimedia direct communication system as set forth in claim 3, wherein said function of enabling the user to input data is active when the client personal computer is not connected to the web server.

5. The multimedia direct communication system as set forth in claim 4, wherein, upon connection of said client personal computer to said web server, the stored data is transmitted to the interlocked web application on the web server.

6. The multimedia direct communication system as set forth in claim 1, wherein said distributed computer network includes an intranet connecting said plurality of client personal computers and an Internet connecting said plurality of computers to said web server, said semi-real-time chat enabled through use of said HTTP protocol and an open port of a proxy server/firewall for communication from said intranet to said Internet.

7. The multimedia direct communication system as set forth in claim 1, wherein said web server includes a function to check for client connection with said web server to determine whether clients are ready to receive chat by interlocking with HTTP protocol.

8. The multimedia direct communication system as set forth in claim 1, wherein said web server includes a CGI interface for continuously distributing several types of information in character form to said application program through said web server from an information provider outside of said web server.

9. A multimedia direct communication system comprising an application program embedded in a plurality of client personal computers connected via a distributed computer network, said application program interlocking with HTTP protocol to communicate with a web server on said distributed computer network using said HTTP protocol, and displaying on each of said personal computers both electronic message communication data and multimedia information received from said web server, both said data and said information being fully supported and controlled by said interlocking with HTTP protocol and said data and said information being displayed in a common display window independently of any browser software activation.

10. The multimedia direct communication system as set forth in claim 9, wherein said multimedia information includes a plurality of multimedia applications.

11. The multimedia direct communication system as set forth in claim 9, wherein said multimedia information includes a plurality of media selected from motion picture, still picture, character information, graphic information, and voice communication.

12. The multimedia direct communication system as set forth in claim 10, wherein said electronic message communication data and multimedia information received from said web server are displayed simultaneously in said common display window.

13. The multimedia direct communication system as set forth in claim 10, wherein each of said client personal computers includes a memory for storing said application program and data from said multimedia applications, storage of said data allowing a user continuing access to said data when said client personal computer is not in communication with said web server.

14. The multimedia direct communication system as set forth in claim 13, wherein said application program has a function enabling a user to input data manually to the memory for storage therein and to transmit said data from the client personal computer to an interlocked web application on the web server.

15. The multimedia direct communication system as set forth in claim 14, wherein said function of enabling the user to input data is active when the client personal computer is not connected to the web server.

16. The multimedia direct communication system as set forth in claim 15, wherein, upon connection of said client personal computer to said web server, the stored data is transmitted to the interlocked web application on the web server.

17. A multimedia direct communication system comprising:

a web server connected to a distributed computer network, said web server including an electronic message communication (chat) server having a CGI interface;

an application program embedded in a plurality of client personal computers connected via said distributed computer network, said application program interlocking with HTTP protocol to work with said web server using said HTTP protocol;

said web server using a PC application so that said plurality of client personal computers communicate with each other in semi-real-time electronic message communication (chat) by interlocking with HTTP protocol;

said application program including a display window for displaying said chat, and also activating, displaying, transmitting and receiving multimedia applications, information and contents by working with said web server through interlocking HTTP protocol, said multimedia applications, information and content being displayed concurrently and in said same display window with said chat, said application program consistently accessing and communicating with said web server by interlocking with HTTP protocol without activating browser software;

each of said client personal computers having a memory for storing said application program and data from said multimedia applications, storage of said data allowing a user continuing access to said data when said client personal computer is not in communication with said web server, said application program having a function enabling a user to input data manually to the memory for storage therein and to transmit said data from the client personal computer to an interlocked web application on the web server, said function of enabling the user to input data being active when the client personal computer is not connected to the web server and, upon connection of said client personal computer to said web server, the stored data being transmitted to the interlocked web application on the web server;

said web server further including a function to check for client connection with said web server to determine whether clients are ready to receive chat by interlocking with HTTP protocol; and said web server further including a CGI interface for continuously distributing several types of information in character form to said application program through said web server from an information provider outside of said web server.

* * * * *